(12) United States Patent
Hennings et al.

(10) Patent No.: US 11,265,479 B2
(45) Date of Patent: Mar. 1, 2022

(54) AUTOMATIC END TO END PHOTOGRAPHIC SYSTEM

(71) Applicant: SMPL Inc., Austin, TX (US)

(72) Inventors: Mark Hennings, Austin, TX (US); Charles Alicea, Austin, TX (US)

(73) Assignee: SMPL INC, Austin, TX (US)

(*) Notice: Subject to any disclaimer, the term of this patent is extended or adjusted under 35 U.S.C. 154(b) by 0 days.

(21) Appl. No.: 16/724,374

(22) Filed: Dec. 22, 2019

(65) Prior Publication Data

US 2020/0204718 A1 Jun. 25, 2020

Related U.S. Application Data

(60) Provisional application No. 62/784,375, filed on Dec. 22, 2018.

(51) Int. Cl.
*H04N 5/225* (2006.01)
*H04N 9/73* (2006.01)
*H04N 5/235* (2006.01)

(52) U.S. Cl.
CPC ......... *H04N 5/2352* (2013.01); *H04N 5/2351* (2013.01); *H04N 9/735* (2013.01)

(58) Field of Classification Search
CPC .... H04N 5/2352; H04N 9/735; H04N 5/2351; H04N 5/232121; H04N 5/23219; H04N 5/23206

See application file for complete search history.

(56) References Cited

U.S. PATENT DOCUMENTS

| | | | |
|---|---|---|---|
| 2008/0101690 A1* | 5/2008 | Hsu | H04N 1/6086 382/162 |
| 2010/0194919 A1* | 8/2010 | Ishii | H04N 9/735 348/224.1 |
| 2017/0134625 A1* | 5/2017 | Salazar | H04N 5/2351 |

* cited by examiner

*Primary Examiner* — Abdelaaziz Tissire
(74) *Attorney, Agent, or Firm* — Shah IP Law, PLLC

(57) ABSTRACT

The present invention relates to an end-to-end photography model for setting the light and exposure in a digital photography device with an external lighting system. The present disclosure is for a system and a method for automatically setting one or more image parameters for improved photography and image aesthetics. Specifically, the present invention is for automatically setting light and exposure which can be implemented on a personal electronic device with an integrated image capturing device having integrated and/or external illumination system. The embodiments described herein in general relate to a system and method for analyzing and controlling image parameters to set precise light and exposure for the electronic image capturing device, particularly for a personal electronic device, such as smartphone and tablet, with an integrated image capturing device.

20 Claims, 8 Drawing Sheets

AUTOMATIC END TO END PHOTOGRAPHIC SYSTEM

CROSS-REFERENCE TO RELATED APPLICATIONS

This application claims priority to U.S. Provisional Patent Application Ser. No. 62/784,375, filed Dec. 22, 2018, entitled "SYSTEM AND METHOD FOR SETTING LIGHT AND EXPOSURE IN AN IMAGE CAPTURING DEVICE." The entire content of that application is incorporated herein by reference.

BACKGROUND

Field of the Art

Embodiments of the present invention described herein generally relate to digital photography with an external lighting system. More specifically, the present invention relates to an end-to-end photography model for setting the light and exposure in a digital photography device with an external lighting system.

Discussion of the State of the Art

Digital photography using mobile computing devices has become a ubiquitous way to take digital photographs. These digital photography systems offer easy of use and convenience. But, often, the images taken with these devices are lacking because of poor lighting and/or poor ability to account for lighting within a digital photography application. For example, mobile computing devices do not offer enough lighting to properly light up one or more subjects in a digital photograph. In addition, or in the alternative, mobile computing device do not offer granular control over camera settings, such as shutter speed, aperture, and ISO, to account for poor lighting conditions.

In an effort to improve digital photographs taken with mobile computing devices, some photographers use external lights that connect to the mobile computing device. These external lights may be used to properly light-up a subject. However, these solutions do not always improve the quality of photographs. For example, external lights—when combined with automatic exposure systems on mobile computing devices—may overexpose the subject of the photograph or may introduce other artifacts (such as motion blur or grain) to underexposed portions of the image, etc. Some photographers use manual controls to manually set shutter speed, exposure, ISO setting on their mobile computing devices when using external lighting systems. But such work-arounds are not ideal because they require significant skill, slow down the photography process, and reduce the user friendliness and ease of use that is generally associated with taking photographs with mobile computing devices.

SUMMARY

The present invention overcomes the limitations described above by introducing an automatic, end-to-end photography model for setting/changing the lighting and exposure settings in a mobile computing to capture aesthetically pleasing images. The objectives of the invention are achieved by the embodiments of the present invention. The embodiments described herein in general relate to a system and method for analyzing and controlling image parameters to set precise light and exposure for the electronic image capturing device, particularly for a personal electronic device, such as smartphone and tablet, with integrated image capturing device. The system and method are particularly advantageous for end-to end photography model as correlation and interdependence between the image parameters are automatically analyzed, and respective values of the image parameters are adjusted thereof.

Specifically, the present invention is for a system, a light source, and/or a computer program product comprising a non-transitory computer readable storage medium having instruction encoded thereon that, when executed by a processor, cause the processor to: receive a digital image representing a view within a field of view of a camera element, wherein the digital image is comprised of one or more subjects; obtain illuminance values associated with one or more areas near the camera element; select the illuminance values that are likely associated with the one or more subjects; calculate a target illuminance values to expose the one or more subjects in an aesthetically desired manner, wherein the target illuminance value is computed from the selected illuminance value; obtain an approximate distance value representing a distance between one or more light sources and the one or more subjects; compute a target brightness value for the one or more light sources, wherein the target brightness value computation is based on the target illuminance value and the obtained approximate distance value; compute actual brightness values for the one or more light sources based on physical limitation factors; compute actual illuminance values based on actual brightness values for the one or more light sources, the obtained approximate distance values, and the selected illuminance values; identify appropriate camera settings for exposing the one or more subjects based on actual illuminance values, the camera settings comprising one or more of: shutter speed, aperture, and image sensor sensitivity; identify appropriate brightness settings based on actual brightness values; provide identified camera settings values to a controller associated with camera element; and provide identified brightness settings to a controller associated with the light source.

The invention may also be comprised of receiving color values for one or more areas around the camera element; computing white balance settings for obtaining an appropriate color the one or more subjects, wherein the white balance settings are computed based on the received color temperature values, wherein the white balance setting is a camera setting; computing color settings for the one or more light sources based on the received color temperature values and/or the computed white balance values; providing computed white balance settings to the controller associated with the camera element; and providing computed color values to the controller associated with the one or more light sources.

In one embodiment, digital images are continuously received from a camera element. In one embodiment, the approximate distance between the light source and the one or more items within the field of view of the camera element is obtained from a distance sensor unit and/or a computing device.

In one embodiment, the distance sensor unit computes the approximate distance value by identifying the distance between the one or more light sources and the one or more subjects that are within the field of view of the camera element that is closest to the one or more light sources.

In one embodiment, the distance sensor unit is comprised of one or more of the following: an infrared emitter, an infrared camera, and a proximity sensor.

In one embodiment, the computing device may compute an approximate distance between the camera element and the one or more items within the field of view of the camera element by applying computer vision analysis.

In one embodiment, computer vision analysis is comprised of identifying one or more likely subjects within the digital image, wherein the one or more likely subjects are identified by identifying, within the digital image, one or more of the following: faces, eyes, human bodies, and/or subject attributes.

In one embodiment, the computer vision analysis is further comprised of applying subject selection analysis to identify the one or more subjects within the identified one or more likely subjects when more than one likely subject is identified.

In one embodiment, the subject selection analysis is comprised of identifying one or more likely subjects having a largest relative size based on identified attributes.

In one embodiment, the sense-vision selection factors are applied to select the approximate distance values from one of the distance sensor or the computing device, wherein the sense-vision selection factors are applied when approximate distance values are received from both the distance sensor and the computing device.

In one embodiment, illuminance values are obtained from one or more illuminance sensors and/or a computing device.

In one embodiment, illuminance values are obtained by applying an estimation analysis to illuminance sensor values obtained from one or more illuminance sensors, wherein the illuminance sensor values represent illuminance measured by each illuminance sensor, and wherein the estimation analysis is comprised of selecting a highest illuminance sensor value obtained from the one or more illuminance sensors.

In one embodiment, color temperature values are obtained from a color sensor and/or a computing device.

In one embodiment, the obtained color temperature values are further comprised of color temperature values and/or color tint values.

In one embodiment, if the one or more light sources is emitting a light, then the obtained color temperature values are adjusted to account for the contributions made by the light sources, wherein the contributions made by the light sources are obtained from the controller associated with the light source.

In one embodiment, adjusting the color temperature values based on a difference between the color limitation factors and the received color temperature values for one or more areas around the camera element.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
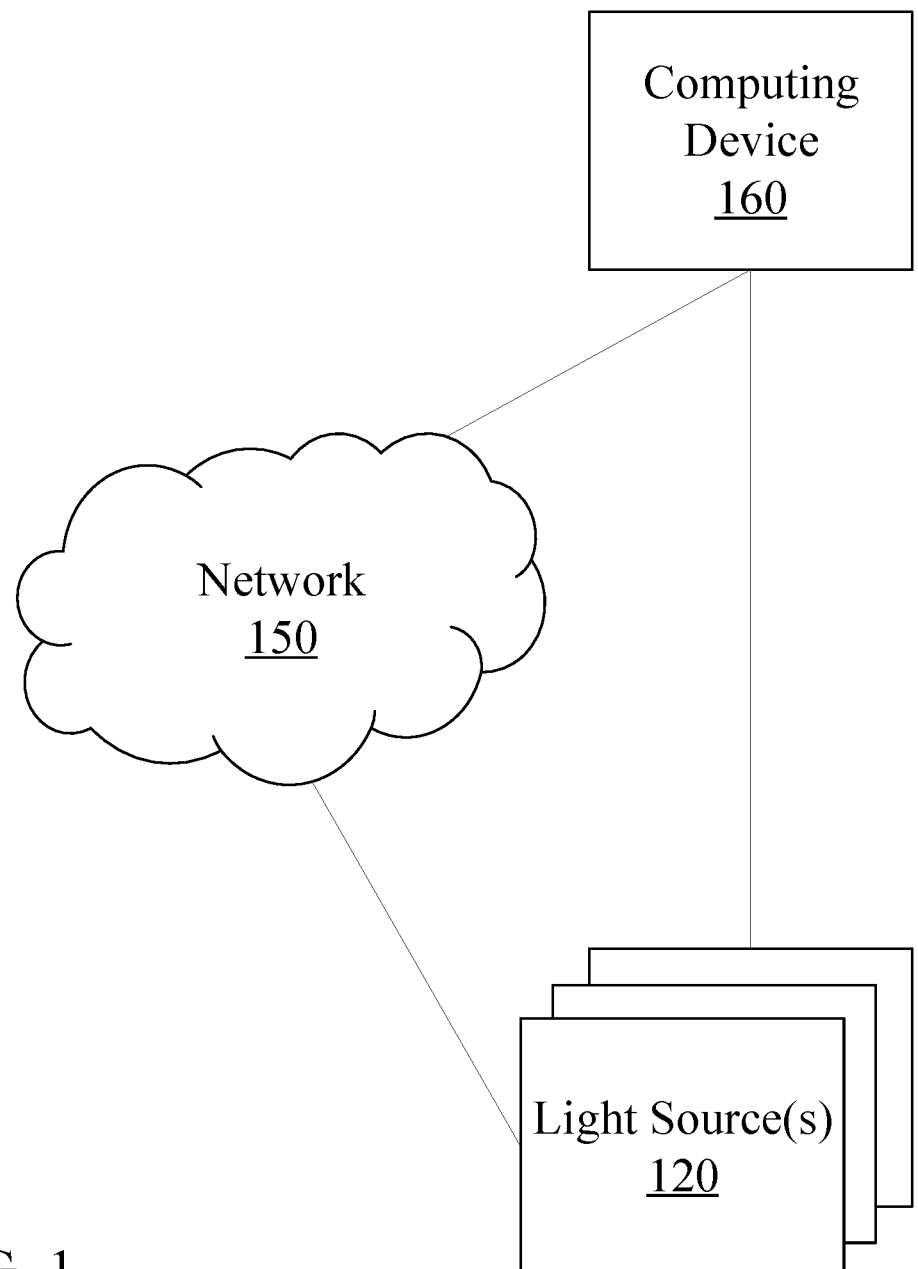
FIG. 1 illustrates a general functional block diagram with respect to an embodiment of the present invention.

The present invention is for an end-to-end photography model for setting the light and exposure in a mobile computing device using an external lighting system.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary conceptual architecture of the invention disclosed herein. It may be comprised of a computing device 160, light source(s) 120, and a network 150. The various components work together, as described herein, to take digital photographs that are exposed, and lit in a desired manner to capture an aesthetically pleasing photograph.

A computing device 160 may be any device that is capable of capturing digital photographs. A computing device, as described in more detail below, may refer to a variety of different devices, including, but not limited to, a mobile phone, smart phone, a tablet computing device, a digital camera, an SLR camera, a mirror-less camera, a laptop computer, a convertible computing device, etc. The computing device 160 may or may not be capable of processing digital images. However, in at least one embodiment, the computing device 160 is comprised of one or more camera elements that are configured to capture digital photographs of items that are within the camera element's field of view. In one embodiment of the invention, as described in greater detail below, the computing device 160 may be further comprised of one or more processors to process digital photographs as well as sensors and lighting units for obtaining additional information for taking a photograph.

Computing device 160 may include, generally, a computer or computing device including functionality for communicating (e.g., remotely) over a network 150 and/or capturing digital images. Computing device(s) 160 may be a server, a desktop computer, a laptop computer, personal digital assistant (PDA), an in- or out-of-car navigation system, a smart phone or other cellular or mobile phone, or mobile gaming device, among other suitable computing devices. Computing devices 160 may execute one or more client applications, such as a web browser (e.g., Microsoft Windows Internet Explorer, Mozilla Firefox, Apple Safari, Google Chrome, and Opera, etc.), or a dedicated application to capture and/or process digital photographs and/or capabilities to interface with a remote statement over a submit user data, or to make prediction queries over a network 150.

In particular embodiments, each computing device 160 may be an electronic device including hardware, software, or embedded logic components or a combination of two or more such components and capable of carrying out the appropriate functions implemented or supported by the computing device 160. For example, and without limitation, a computing device 160 may be a desktop computer system, a notebook computer system, a netbook computer system, a handheld electronic device, or a mobile telephone. The present disclosure contemplates any computing device 160. A computing device 160 may enable a network user at the computing device 160 to access network 150. A computing device 160 may enable its user to communicate with other users at other user devices 110.

A computing device 160 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A computing device 160 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the computing device 160 one or more Hyper Text Markup Language (HTML) files responsive to the HTTP request. The computing device 160 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The computing device 160 may also include an application that is loaded onto the computing device 160. The application 110 obtains data from the network 150 and displays it to the user within an application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

One or more light sources 120 disclosed herein may emit light. In one embodiment, the light may be configurable to enable the computing device 160 to ultimately capture a digital photograph that may be considered aesthetically pleasing. In one embodiment, the color temperature and/or the tint of the light source 120 may be configurable to obtain an aesthetically pleasing effect. In one embodiment, the light sources 120 may emit light in the same direction as the camera element's field of view. For example, the light source 120 may be a ring light that may substantially surround the computing device 160. In other embodiments, the light source 120 may be integrated with the computing device 160. In other embodiments, the light source can be remote from the computing device 160, however, the light sources 120 may communicate with the computing device via a network 150 and/or other wired or wireless communications means. In one embodiment, light source 150 may include conventional components known in the art for generating such light, such as a bulb or a light-emitting diode (LED) or similar light emitting source(s). Multiple light sources 120 facing different directions may be used without departing from the scope of the invention.

In one embodiment, the computing device 160 and the light sources 120 may be connected to each other via a wired and/or a wireless communication means. In one embodiment, the computing device 160 and the light sources 120 may be connected via a network 150. Moreover, the processing that is described herein as being performed in the system, may be processed in a cloud computing device and the results may be sent to the computing device 160 and the light sources 120 via the network 150.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

Figure 2:
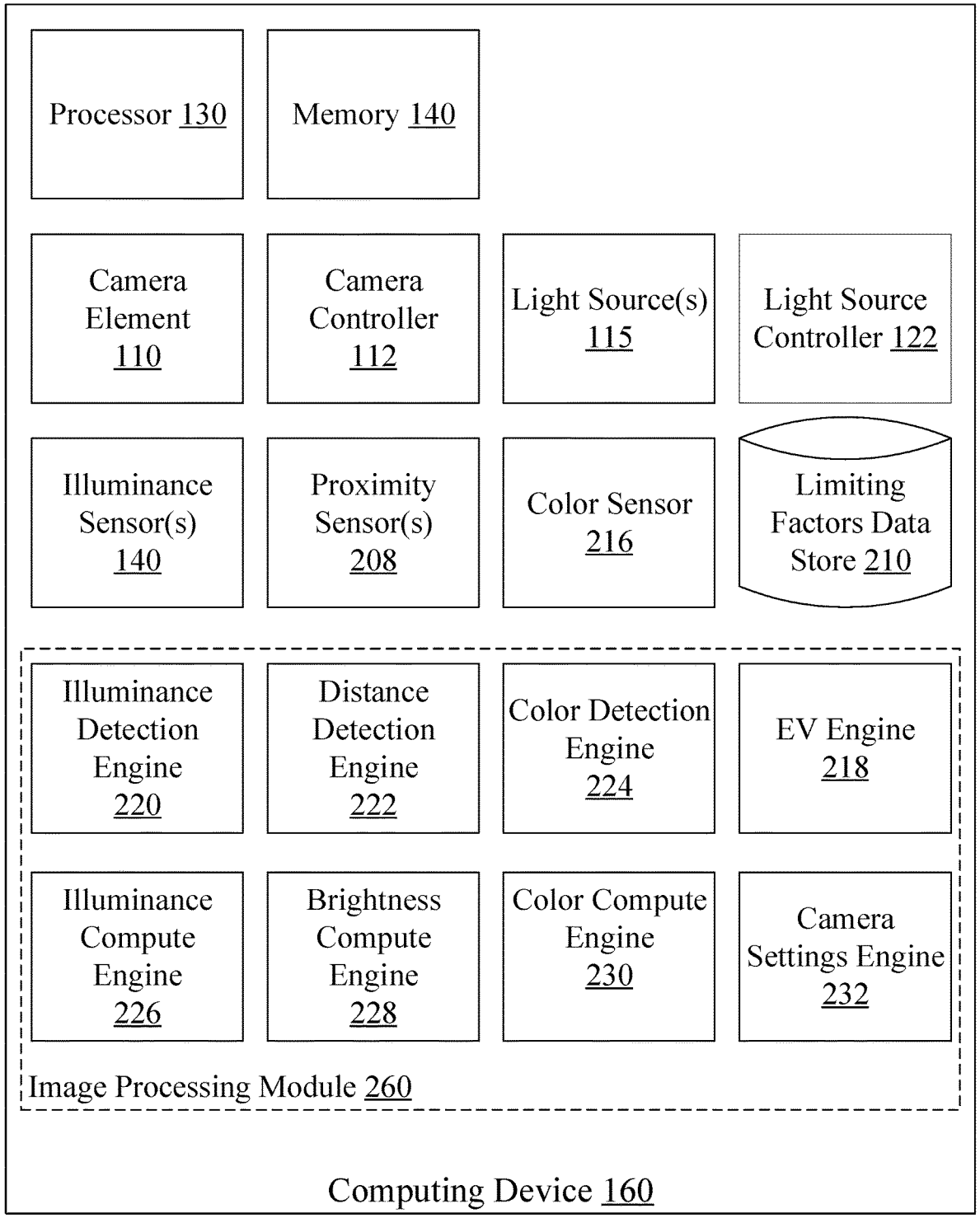
FIG. 2 illustrates a block diagram of an aspect of the present invention.

FIG. 2 illustrates the components of the computing device 160 in more detail in accordance with an exemplary embodiment of the invention. The computing device 160 may be comprised of a processor 130, memory 140, camera element 110, camera controller 112, light source(s) 115, light source controller 122, illuminance sensor(s) 140, proximity sensor(s) 208, color sensor(s) 216, limiting factors data store 210, image processing module 260, which may be further comprised of illuminance detection engine 220, distance detection engine 222, color detection engine 224, EV engine 218, illuminance compute engine 226, brightness compute engine 228, color compute engine 230, and camera settings engine 232. Other alternative components and/or modules and sub-modules may be used in accordance with the description herein, as would be apparent to a person of ordinary skill in the art, without departing from the scope of the invention. In accordance with an embodiment of the invention, the computing device 160 can be configured to capture and process digital images. The computing device 160 may also receive information related to one or more subjects of the digital image, the subject's distance from a light source, illuminance information, color values, etc. The received information may be used to change camera settings and camera element device settings to capture an aesthetically please photograph.

The processor 130 and memory 140 enable the computing device 160 to store information and process information. In one embodiment, the processor 130 processes data that extracted from a digital image and/or obtained from one or more sensors in accordance with instructions that may be provided by hardware and/or software modules, as would be readily apparent to a person of ordinary skill in the art without departing from the scope of the invention.

The camera element 110 is configured to capture digital images. The camera element 110, in one embodiment, may be integrated into the same housing that embodies the computing device 160. However, the camera element 110 may be remote and may connect to the computing device via wired and/or wireless communications means. In one embodiment, the camera element may have variety of different settings that may be altered to capture an image that is optimized for a variety of circumstances, wherein the settings may include, for example, shutter speed, aperture, sensor light sensitivity (hereinafter also referred to as "ISO"), and white-balance. These various settings may be controlled by a camera controller 112.

The light source 115 may be configured to emit a light in one or more directions. In one embodiment, the light source 115 is integrated into the same housing as the computing device 160. In other embodiments, the light source 115 may be independent from the computing device 160 but may communicate with the computing device 160 via wired and/or wireless communications means. In one embodiment, the light source 115 may be a ring light that may partially surround the computing device 160 and/or the camera element 110. In one embodiment, the light source 115 may be directed to emit a pre-determined brightness and/or color of light to create a scene that is pre-calculated to be aesthetically pleasing.

The light source controller 122 may control the one or more light source 115. In one embodiment, the light source controller 122 may control a variety of different aspects of the light source 115, including, but not limited to, brightness, direction, color temperature, tint, etc. The light source controller 122 may also provide the above referenced setting or read-outs, referred to as current settings information to one or more other devices to enable the other devices to perform calculations based on the current settings.

Illuminance values, which generally refers to the amount of luminous flux per unit area, may be measured/approximated by one or more of the following and/or a combination of one or more of the following: the illuminance sensor 140, and/or the image processing module 260, which may be further comprised of the illuminance detection engine 220, and the illuminance compute engine 226 (the illuminance values can also, or in the alternative, be calculated by one or more light sources 120, as described in greater detail below). The various components may be configured to measure an amount of illuminance and obtain illuminance values associated with one or more areas near the computing device 160 and/or the camera element 110. In one embodiment, an average illuminance value may be computed for any given digital photograph.

In one embodiment, the illuminance sensor 140 may measure illuminance within an area that is at or near the camera element's field of view. In one embodiment, illuminance sensors 140 may be disposed within the same housing as the computing device 160 and/or the camera element 110. In one embodiment, the illuminance sensor 140 may be facing the same direction as the field of the view of the camera element 110 and/or behind the camera element's field of view.

The image processing module 160 may also (or in the alternative) measure illuminance by digitally processing the image that is captured by the camera element 110. In one embodiment, the illuminance detection engine 220 identifies one or more areas within a digital image that have high levels illuminance as based on by a pre-determined threshold.

If more than one illuminance values are obtained by the illuminance sensor 140 and/or the illuminance detection engine 220, then an estimation analysis may be applied, which may comprise selecting the highest illuminance sensor value among the obtained illuminance sensor values. Generally, the highest illuminance value is selected because it represents a light source that is likely shining on a subject (herein the system assumes that the subject is lit by a direct light source). The estimation analysis may be performed by the illuminance sensor 140, the processor 130 and/or the image processing module 260 and/or any other system described herein.

The illuminance compute engine 226 calculates target illuminance values to light-up the one or more subjects in an aesthetically pleasing manner, wherein the target illuminance value is computed from the selected illuminance value. Other data points may be used to compute target illuminance, including, but not limited to, light fall-off, distance and/or angle from subject, etc. In one instance, once an illuminance value is obtained and/or selected, the illuminance compute engine 226 uses that value as a baseline, and may set a target illuminance to be a factor of the obtained/selected illuminance value. In one embodiment, target illuminance may be computed to be two times, three times the value of the obtained/selected illuminance value. Other ratios may be used without departing from the scope of the invention, as would be understood by a person of ordinary skill in the art. In one embodiment, the target illuminance may be set at any value that can overpower obtained/selected illuminance. This overpowering effect creates uniform lighting conditions on a subject, including for example, a subject's face.

Approximate distance values, which generally refers to the distance between a system component and a subject who may be represented in a digital photograph that is captured by the camera element, may be measured/approximated by one or more of the following and/or a combination of one or more of the following, or a combination of one or more of the following: the proximity sensor 208 and/or a distance detection engine 222 (the approximate distance values can also, or in the alternative, be calculated by one or more light sources 120, as described in greater detail below).

The proximity sensor 208 can be comprised of distance sensors, such as one or more infrared emitters and infrared cameras to measure distance between a component of the system described herein and one or more likely subjects that may be captured in a digital photograph. In one embodiment, if more than one likely subject is identified by the proximity sensor 208, then the subject that is closest to the one or more light sources and/or the camera element may be used to obtain an approximate distance value (between a system component and the subject).

The distance detection engine 222 applies computer vision analysis to obtain an approximate distance between a subject and a system component (such as camera element and/or light source). In one embodiment, the computer vision analysis comprised of identifying one or more likely subjects within a digital image. The one or more likely subjects can be identified by identifying, within the digital image, one or more subject attributes. If a face is the subject, for example, it may be identified based on attributes of the face such as the size of the face or attributes of the face, like the distance between the eyes, etc. Other subject attributes may be used, as would be understood by persons of ordinary skill in the art, without departing from the scope of the invention. In addition, the computer vision analysis can include subject selection analysis. With subject selection analysis, the subject attributes mentioned above can be used to identify one or more subjects within the digital representation when there is likely to be more than one subject and/or face identified. The subject selection analysis can also involve identifying one or more likely subjects having a largest relative size based on the subject attributes such as face, eyes, nose, etc. If multiple faces are detected to be less than a threshold distance away from each other, then a blended distance (i.e. average, median, weighted distance, etc.) may be used (the system would be making an assumption that the multiple faces are a group of people who, collectively, may be the intended subjects).

If distance values are obtained from both the proximity sensor 208 and the distance detection engine 222, then sense-vision selection factors may be applied to select approximate distance values of the one or more subjects. The sense-vision selection factors may generally outline the limitations of one or more proximity sensor 208 and/or the detection engine 222. In one instance, for example, a proximity sensor may not be very accurate after six feet. In these cases, the distance values measured by the proximity sensor 208 may be used if the value falls between, for example, one inch and six feet. The distance detection engine values 222 may be used if the distance value is beyond six feet.

A brightness compute engine 228 can calculate target brightness values at or near the computing device 160 and/or the subject and/or the light source. The light brightness can include the power of a light source, which can be measured in candela (cd), and can be calculated for how bright the light needs to be to reach the subjects and illuminate the subject at target illuminance. The light brightness can be based on the target illuminance as well as the distance and angle of the subjects from the computing device 160 and/or the light source 120.

The brightness compute engine 228 can also calculate actual brightness values at or near the computing device 160 and/or the subject and/or the light source. For example, a lookup table (such as, for example, an illuminating engineering society (IES)) may be used to compute target brightness. The IES table can indicate how the light can perform at different angles and distances for the light output. The brightness compute engine 228 may also identify appropriate brightness settings based on actual brightness values. Accordingly, the brightness compute engine 228 can use the IES table, and the target illuminance to determine target brightness values and actual brightness values. The brightness compute engine 228 can be configured in one or more areas of the image processing module 260 within the computing device 160. The limiting factors data store 210 can include the physical limitations of the computing device 160. The physical limitations of the light source 120 as well as the IES table may provide target brightness values.

Referring again to the illuminance compute engine 226, once the actual brightness values are obtained, the illuminance compute engine 226 computes actual illuminance values based on actual brightness values for the one or more light sources, the obtained approximate distance values, and the selected illuminance values.

A color sensor 216, a color detection engine 224, and a color compute engine 230 can be configured to measure color temperatures and/or color tint values in the area surrounding the computing device 160 and receive color values and/or color tint values for one or more areas around the camera element 110. The color values may describe ambient lighting conditions (more specifically, in accordance with an embodiment of the invention, the ambient color temperature and the tint of ambient lighting). By taking into account one or more areas, the various color sensing systems 216, 224, and 230 may be able to obtain an average, median or some other value associated with ambient color. The ambient color values may be used to output a light color that is considered aesthetically pleasing in relation to the measure ambient color values.

The color sensor 216 is configured to measure color values in and around the computing device 160 and/or the subject and/or the light source 120. In one embodiment, the color values may be comprised of color temperature and/or color tint. The color sensors may be disposed with the same housing as the computing device 160. In other embodiments, the color sensors may be embodied in the light source 120 and may communicate with the computing device 160 via wired or wireless communication means.

The color detection engine 224 and a color compute engine 230 digitally processes a digital image that is captured by the camera element 110 to identify color values in the image. In one embodiment, the color values may be comprised of color temperature and/or color tint. The specific mechanism for measuring color values via digital image processing, as would be understood by persons of ordinary skill in the art, are incorporated herein.

The camera settings engine 232 can include the camera settings of the computing device 160. The camera settings can include shutter speed, aperture, image sensor sensitivity, and/or white balance. The camera setting engine 232 can identify the appropriate camera settings for exposing one or more subjects based on the actual illuminance values. A variety of different camera settings may be manipulated when available, including, but not limited to shutter speed, aperture, image sensor sensitivity and/or white balance settings. Unlike traditional systems, which compute these values based on available light immediately before the time that a photograph may be taken, the present process essentially permits the process to predict the lighting at a future event when the light settings may be applied. The camera settings value may be based on calculated actual illuminance, and/or actual brightness. A variety of computation models, which may be known to persons of ordinary skill in the art may be used to compute camera settings. Those computation models may be used without departing from the scope of the invention. In addition, the processor can also identify appropriate brightness settings based on actual brightness values.

The camera settings engine 232 can change the white balance settings to capture an aesthetically pleasing photograph. In one embodiment, the white balance may be set based on captured color values and/or the color emitted by a light source 120. In other embodiments, the white balance settings can be computed based on received color temperature values. The white balance setting can also be a setting within the camera settings engine 232. The camera settings engine 232 can be configured in one or more areas of the image processing module 260 within the computing device 160. A variety of different methodologies and/or rules may be used to compute color settings, as would be readily apparent to a person of ordinary skill in the art, without departing from the scope of the invention. In one specific embodiment, the color settings may match, as closely as permissible based on physical and/or computation limitations of the light source, the color temperature and/or tint of ambient lighting. This ensures that strange color casts are not formed on the subject within a digital photograph that may be captured. More specifically, if the subject of the photograph is a human, the color settings computation step may be used properly light-up the subject's skin tones.

An exposure value (EV) engine 218 can calculate and/or look-up the exposure value of the computing device 160 to obtain desired camera settings. The exposure value can represent how much light that the camera element 112 is going to need to let in to properly expose the subjects and faces. Other camera settings or combination of camera settings such as shutter speed, ISO, aperture may be computed based on the obtained EV value.

Figure 3:
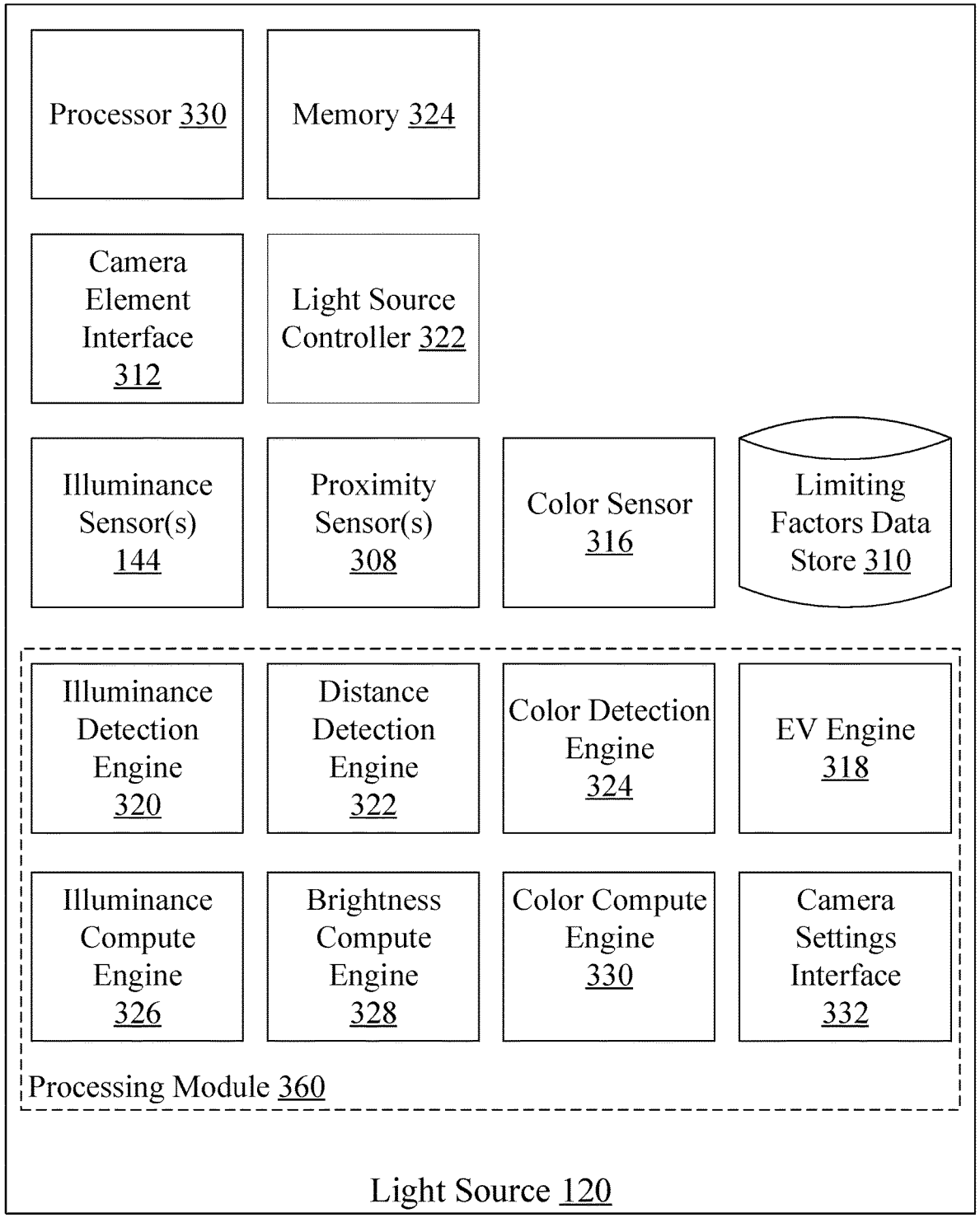
FIG. 3 illustrates block diagram of an aspect of the present invention.

FIG. 3 illustrates the components of the light source 120 in more detail in accordance with an exemplary embodiment of the invention. The light source 120 may be comprised of a processor 330, memory 144, camera element 110, camera controller 112, light source(s) 115, light source controller 122, illuminance sensor(s) 144, proximity sensor(s) 308, color sensor(s) 316, limiting factors data store 310, processing module 360, which may be further comprised of illuminance detection engine 320, distance detection engine 322, color detection engine 324, EV engine 318, illuminance compute engine 326, brightness compute engine 328, color compute engine 330, and camera settings interface 332. Other alternative components and/or modules and sub-modules may be used in accordance with the description herein, as would be apparent to a person of ordinary skill in the art, without departing from the scope of the invention. In accordance with an embodiment of the invention, the computing device 160 can be configured to capture and process digital images. The computing device 160 may also receive information related to one or more subjects of the digital image, the subject's distance from a light source, illuminance information, color values, etc. The received information may be used to change camera settings and camera element device settings to capture an aesthetically please photograph.

The processor 330 and memory 144 enable the computing device 160 to store information and process information. In one embodiment, the processor 330 processes data that extracted from a digital image and/or obtained from one or more sensors in accordance with instructions that may be provided by hardware and/or software modules, as would be readily apparent to a person of ordinary skill in the art without departing from the scope of the invention.

The light source 115 may be configured to emit a light in one or more directions. In one embodiment, the light source 115 is integrated into the same housing as the computing device 160. In other embodiments, the light source 115 may be independent from the computing device 160 but may communicate with the computing device 160 via wired and/or wireless communications means. In one embodiment, the light source 115 may be a ring light that may partially surround the computing device 160 and/or the camera element 110.

The light source controller 122 may control the one or more light source 115. In one embodiment, the light source controller 122 may control a variety of different aspects of the light source 115, including, but not limited to, brightness, direction, color temperature, tint, etc. The light source controller 122 may also provide the above referenced setting or read-outs, referred to as current settings information to one or more other devices to enable the other devices to perform calculations based on the current settings.

Illuminance values, which generally refers to the amount of luminous flux per unit area, may be measured/approximated by one or more of the following and/or a combination of one or more of the following: the illuminance sensor 144, and/or the processing module 360, which may be further comprised of the illuminance detection engine 320, and the illuminance compute engine 326 (the illuminance values can also, or in the alternative, be calculated by one or more light sources 120, as described in greater detail below). The various components may be configured to measure an amount of illuminance and obtain illuminance values associated with one or more areas near the computing device 160 and/or the camera element 110.

In one embodiment, the illuminance sensor 144 may measure illuminance within an area that is at or near the camera element's field of view. In one embodiment, illuminance sensors 144 may be disposed within the same housing as the computing device 160 and/or the camera element 110. In one embodiment, the illuminance sensor 144 may be facing the same direction as the field of the view of the camera element 110 and/or behind the camera element's field of view.

The image processing module 160 may also (or in the alternative) measure illuminance by digitally processing the image that is captured by the camera element 110. In one embodiment, the illuminance detection engine 320 identifies one or more areas within a digital image that have high levels illuminance as based on by a pre-determined threshold.

If more than one illuminance values are obtained by the illuminance sensor 144 and/or the illuminance detection engine 320, then an estimation analysis may be applied, which may comprise selecting the highest illuminance sensor value among the obtained illuminance sensor values. Generally, the highest illuminance value is selected because it represents a light source that is likely shining on a subject (herein the system assumes that the subject is lit by a direct light source). The estimation analysis may be performed by the illuminance sensor 144, the processor 330 and/or the processing module 360 and/or any other system described herein.

The illuminance compute engine 326 calculates target illuminance values to expose the one or more subjects in an aesthetically pleasing manner, wherein the target illuminance value is computed from the selected illuminance value. Other data points may be used to compute target illuminance, including, but not limited to, light fall-off, distance and/or angle from subject, etc. In one instance, once an illuminance value is obtained and/or selected, the illuminance compute engine 326 uses that value as a baseline, and may set a target illuminance to be a factor of the obtained/selected illuminance value. In one embodiment, target illuminance may be computed to be two times, three times the value of the obtained/selected illuminance value. Other ratios may be used without departing from the scope of the invention, as would be understood by a person of ordinary skill in the art. In one embodiment, the target illuminance may be set at any value that can overpower obtained/selected illuminance. This overpowering effect creates uniformity lighting conditions on a subject, including for example, a subject's face.

Approximate distance values, which generally refers to the distance between a system component and a subject who may be represented in a digital photograph that is captured by the camera element, may be measured/approximated by one or more of the following and/or a combination of one or more of the following, or a combination of one or more of the following: the proximity sensor 308 and/or a distance detection engine 322 (the approximate distance values can also, or in the alternative, be calculated by one or more light sources 120, as described in greater detail below).

The proximity sensor 308 can be comprised of distance sensors, such as one or more infrared emitters and infrared cameras to measure distance between a component of the system described herein and one or more likely subjects that may be captured in a digital photograph. In one embodiment, if more than one likely subject is identified by the proximity sensor 308, then the subject that is closest to the one or more light sources and/or the camera element may be used to obtain an approximate distance value (between a system component and the subject).

The distance detection engine 322 applies computer vision analysis to obtain an approximate distance between a subject and a system component (such as camera element and/or light source). In one embodiment, the computer vision analysis comprised of identifying one or more likely subjects within a digital image. The one or more likely subjects can be identified by identifying, within the digital image, one or more subject attributes. If a face is the subject, for example, it may be identified based on attributes of the face such as the size of the face or attributes of the face, like the distance between the eyes, etc. Other subject attributes may be used, as would be understood by persons of ordinary skill in the art, without departing from the scope of the invention. In addition, the computer vision analysis can include subject selection analysis. With subject selection analysis, the subject attributes mentioned above can be used to identify one or more subjects within the digital representation when there is likely to be more than one subject and/or face identified. The subject selection analysis can also involve identifying one or more likely subjects having a largest relative size based on the subject attributes such as face, eyes, nose, etc. If multiple faces are detected to be less than a threshold distance away from each other, then a blended distance (i.e. average, median, weighted distance, etc.) may be used (the system would be making an assumption that the multiple faces are a group of people who, collectively, may be the intended subjects).

If distance values are obtained from both the proximity sensor 308 and the distance detection engine 322, then sense-vision selection factors may be applied to select approximate distance values of the one or more subjects. The sense-vision selection factors may generally outline the limitations of one or more proximity sensor 308 and/or the detection engine 322. In one instance, for example, a proximity sensor may not be very accurate after six feet. In these cases, the distance values measured by the proximity sensor 308 may be used if the value falls between, for example, one inch and six feet. The distance detection engine values 322 may be used if the distance value is beyond six feet.

A brightness compute engine 328 can calculate target brightness values at or near the computing device 160 and/or the subject and/or the light source. The light brightness can include the power of a light source, which can be measured in candela (cd), and can be calculated for how bright the light needs to be to reach the subjects and illuminate the subject at target illuminance. The light brightness can be based on the target illuminance as well as the distance and angle of the subjects from the computing device 160 and/or the light source 120.

The brightness compute engine 328 can also calculate actual brightness values at or near the computing device 160 and/or the subject and/or the light source. For example, a lookup table (such as, for example, an illuminating engineering society (IES)) may be used to compute target brightness. The IES table can indicate how the light can perform at different angles and distances for the light output. The brightness compute engine 328 may also identify appropriate brightness settings based on actual brightness values. Accordingly, the brightness compute engine 328 can use the IES table, and the target illuminance to determine target brightness values and actual brightness values. The brightness compute engine 328 can be configured in one or more areas of the processing module 360 within the computing device 160. The limiting factors data store 310 can include the physical limitations of the computing device 160. The physical limitations of the light source 120 as well as the IES table may provide target brightness values.

Referring again to the illuminance compute engine 326, once the actual brightness values are obtained, the illuminance compute engine 326 computes actual illuminance values based on actual brightness values for the one or more light sources, the obtained approximate distance values, and the selected illuminance values.

A color sensor 316, a color detection engine 524, and a color compute engine 330 can be configured to measure color temperatures and/or color tint values in the area surrounding the computing device 160 and compute appropriate color values and/or color tint values for the light source 120.

The color sensor 316 is configured to measure color values in and around the computing device 160 and/or the subject and/or the light source 120. In one embodiment, the color values may be comprised of color temperature and/or color tint. The color sensors may be disposed with the same housing as the computing device 160. In other embodiments, the color sensors may be embodied in the light source 120 and may communicate with the computing device 160 via wired or wireless communication means.

The color detection engine 324 digitally processes a digital image that is captured by the camera element 110 to identify color values in the image. In one embodiment, the color values may be comprised of color temperature and/or color tint. The specific mechanism for measuring color values via digital image processing, as would be understood by persons of ordinary skill in the art, are incorporated herein.

The color compute engine 330 computes color values for lighting a subject in an aesthetically pleasing manner. In one embodiment, the color values may be comprised of color temperature and/or color tint.

The camera settings interface 322 is configured interface with a camera element 110 to appropriately change the camera settings (if necessary) to capture aesthetically pleasing photographs. In one embodiment, the camera settings interface 322 may help set a variety of different settings that may be altered to capture an image that is optimized for a variety of circumstances, wherein the settings may include, for example, shutter speed, aperture, sensor light sensitivity (hereinafter also referred to as "ISO"), and white-balance. In one embodiment, the camera settings interface 332. The camera setting interface 322 can receive the appropriate camera settings for exposing one or more subjects and faces based on the actual illuminance values. The camera settings interface 332 can set a consistent white balance with the absence of the unwanted tint of colors and/or match light color temperature of the light source to the ambient lighting conditions.

An exposure value (EV) engine 318 can calculate and/or look-up the exposure value of the computing device 160 to obtain desired camera settings. The exposure value can represent how much light that the camera element 112 is going to need to let in to properly expose the subjects and faces. Other camera settings or combination of camera settings such as shutter speed, ISO, aperture may be computed based on the obtained EV value.

Figure 4:
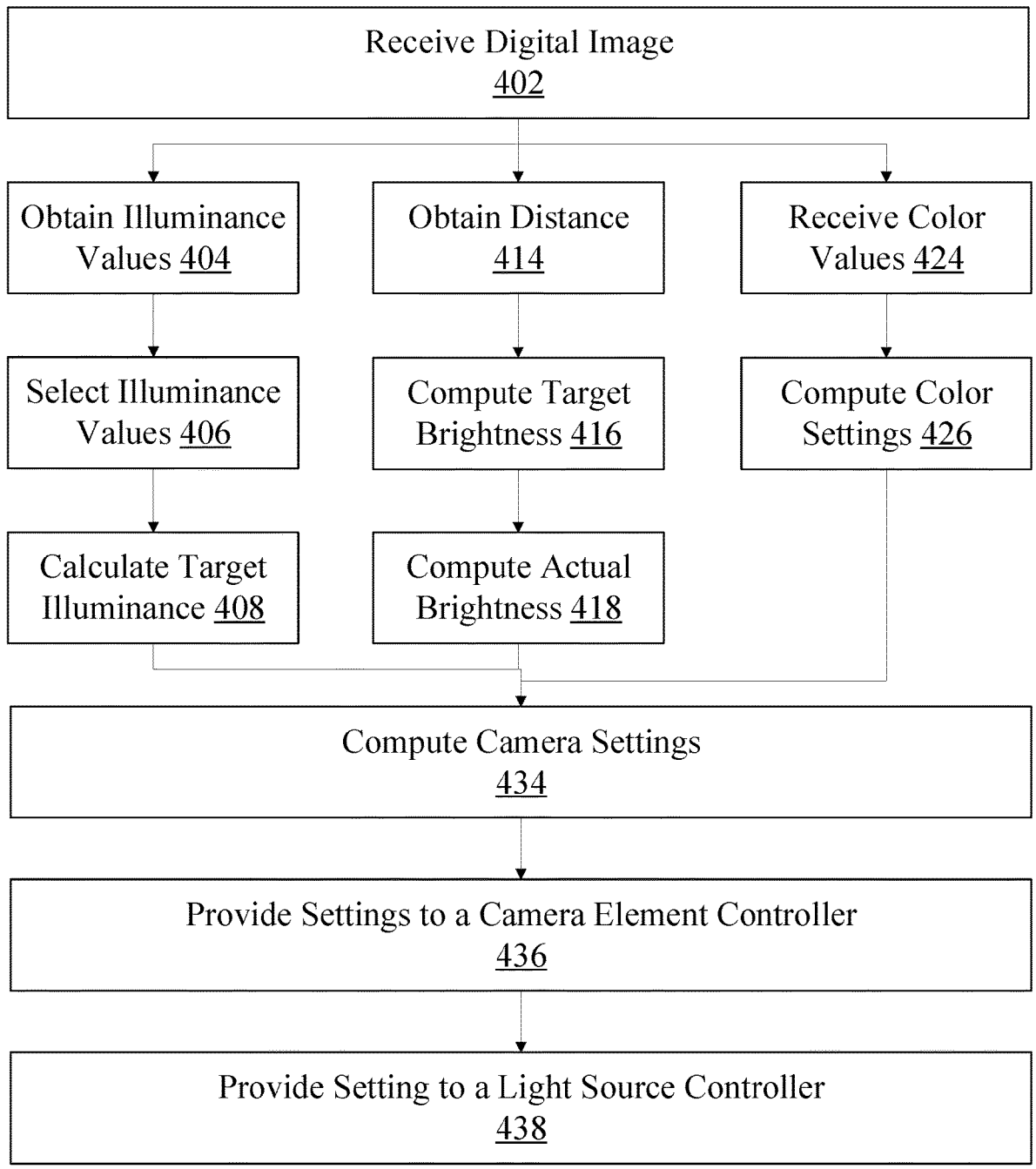
FIG. 4 illustrates a flowchart with respect to an embodiment of the invention.

FIG. 4 depicts a flowchart of a method 400 for automatically setting light and exposure which can be implemented on a computing device and/or a light source with an image capturing device. The computing device can comprise a non-transitory computer readable storage medium. The personal electronic device includes a processor to configured execute encoded instructions described below. The method 400 includes a step 402 of receiving a digital image representing a view within a field of view of a camera element. The digital image can be comprised of one or more subjects.

The method further includes a step 404 of obtaining illuminance values associated with one or more areas near the camera element. The illuminance values may be obtained from anywhere near the electronic device. The areas can include areas within the camera element's filed of view and well as (or in the alternative) outside the camera's field of view, such as behind the device.

At step 406, illuminance values that are likely associated with the one or more subjects and/or faces are selected. In one embodiment, the illuminance value may be selected 406 from among the various illuminance values that are obtain at step 404. A variety of different methodologies may be employed for selecting 406 illuminance from among the various illuminance values, as would be appreciated by persons of ordinary skill in the art. Those methodologies are incorporated herein. In specific embodiment, the process of selecting 404 the illuminance value is comprised of selecting the highest illuminance value from among the various illuminance values that are obtained at step 404.

The method may be further comprised of step 408 of calculating a target illuminance to appropriately light-up one or more subjects in an aesthetically pleasing manner. The target illuminance can be computed from the selected illuminance value(s). Once the ambient values that are associated with the selected illuminance value(s) are known, the process may calculate a target illuminance that is greater than the ambient light values. The target illuminance value, in one instance, may be 2× or 3× greater than the measured illuminance value, which enables the light source to overpower ambient light and create uniform light across the entirety of a subject if possible. At this point, the process may or may not know where the subject of the digital photograph may be. In those instances where the subject is not yet known, the process assumes that the selected illuminance value is likely associated with the one or more subjects.

At step 414, the processor can obtain an approximate distance value between one or more components and one or more subjects or likely subjects (which are generally assumed to be at or near an area that is associated with the selected illuminance value). The approximate distance value can represent a distance between one or more light sources 120 and/or one or more light elements 110 to the one or more subjects. A variety of different mechanisms may be used to compute approximate distance values including, for example, data obtained from a proximity sensor, and/or based on computer vision analysis, which may compute an approximate distance based on relative size of the subject in a digital photograph. Other methodologies to compute distance may be used, as would be apparent to a person of ordinary skill in the art, without departing from the scope of the invention. Additional detail about calculating the approximate distance value is provided above in reference to FIGS. 2 and 3—that discussion is incorporated by reference herein.

At step 416, target brightness value(s) may be computed. As described above, the target brightness value represents the brightness of the light source that may be necessary to illuminate the subject to target illuminance. As such, the target brightness value computation can be based on the target illuminance value and the obtained approximate distance value between a light source a subject. The computation 416 may be comprised of identifying wattage that may be associated with outputting the amount of light necessary to light-up the subject to target illuminance.

The method also includes a step 418 computing actual brightness values for the one or more light sources. In one embodiment, the computation 418 may be based on any physical limitation factors, which may take into account distance and angle between the light source and the subject, as well as maximum and minimum brightness values that may be achievable for a given light source 120. By applying the various known parameters, the process computes 418 the actual brightness and/or illuminance that a subject will have when the light source is configured to output target brightness.

Further, the processor can be configured to compute actual illuminance values based on actual brightness values for the one or more light sources, the obtained approximate distance values, and the selected illuminance values. In one embodiment, the actual illuminance value may be directly correlated to actual brightness value when accounting for distance and angle between the light source and the subject.

At step 424, color values can be received. Color values may be comprised of color temperature and/or tint information associated with one or more areas within and/or outside the field of view of the camera element. The color values may describe ambient lighting conditions (more specifically, in accordance with an embodiment of the invention, the ambient color temperature and the tint of ambient lighting). By taking into account one or more areas, the process may be able to obtain an average, median or some other value associated with ambient color. The ambient color values may be used to output a light color that is considered aesthetically pleasing in relation to the measure ambient color values.

At step 426, the color settings can be computed such that a light source may emit a color that may be considered aesthetically pleasing within the context of ambient color values. A variety of different methodologies and/or rules may be used to compute 426 color settings, as would be readily apparent to a person of ordinary skill in the art, without departing from the scope of the invention. In one specific embodiment, the color settings may match, as closely as permissible based on physical and/or computation limitations of the light source, the color temperature and/or tint of ambient lighting. This ensures that strange color casts are not formed on the subject within a digital photograph that may be captured. More specifically, if the subject of the photograph is a human, the color settings computation 426 step may be used properly light-up the subject's skin tones.

At step 434, appropriate camera settings may be computed 434 for appropriately exposing the one or more subjects based on the actual illuminance values. A variety of different camera settings may be manipulated when available, including, but not limited to shutter speed, aperture, image sensor sensitivity and/or white balance settings. Unlike traditional systems, which compute these values based on available light immediately before the time that a photograph may be taken, the present process essentially permits the process to predict the lighting at a future event when the light settings may be applied. The camera settings value may be based on calculated actual illuminance, and/or actual brightness. A variety of computation models, which may be known to persons of ordinary skill in the art may be used to compute camera settings. Those computation models may be used without departing from the scope of the invention. In addition, the processor can also identify appropriate brightness settings based on actual brightness values.

At step 436, the processor can provide the identified camera settings to a controller associated with the camera element. Further, at step 438, the processor can provide identified brightness settings to a controller associated with the light source. Camera setting While exemplary embodiments are described herein, it is not intended that these embodiments describe all possible forms of the invention. Rather, the words used in the specification are words of description rather than limitation, and it is understood that various changes may be made without departing from the scope of the invention. Additionally, the features of various implementing embodiments may be combined to form further embodiments of the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
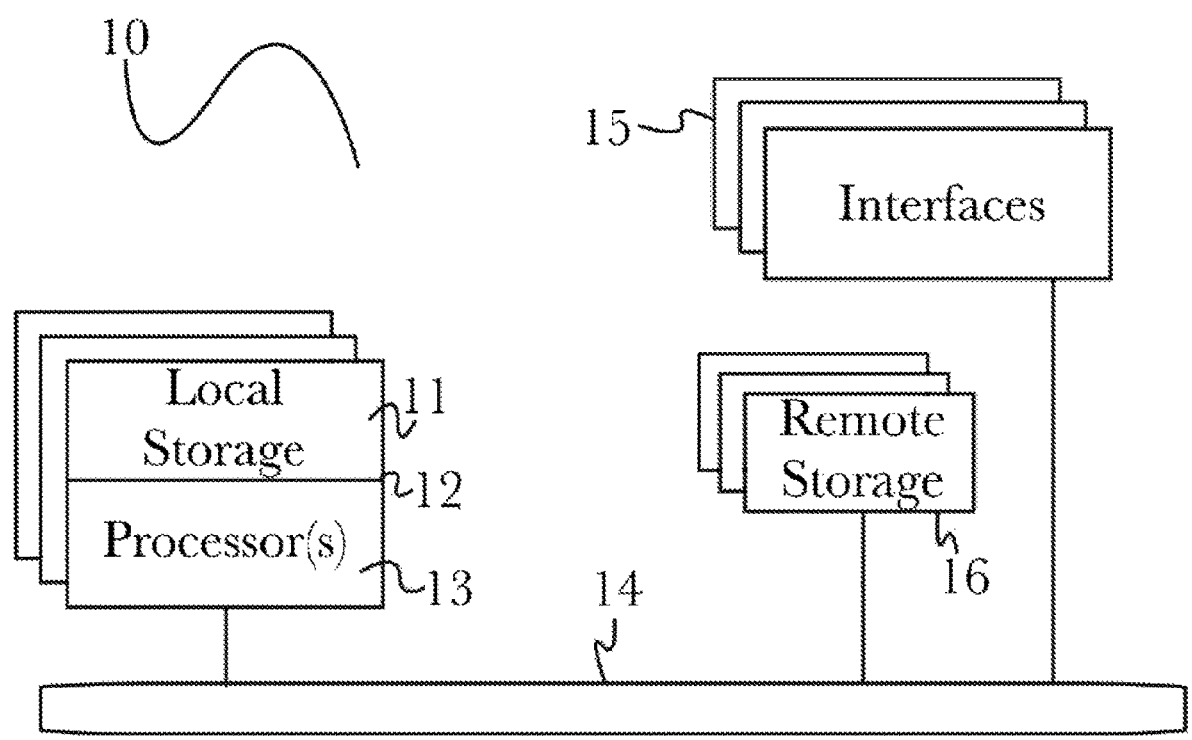
FIG. 5 is a block diagram of an aspect of the present invention illustrating an exemplary hardware architecture of a computing device, according to a preferred embodiment of the invention.

Referring now to FIG. 5, there is shown a block diagram depicting an exemplary computing device 500 suitable for implementing at least a portion of the features or functionalities disclosed herein. Computing device 500 may be, for example, any one of the computing machines listed in the previous paragraph, or indeed any other electronic device capable of executing software- or hardware-based instructions according to one or more programs stored in memory. Computing device 500 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 500 includes one or more central processing units (CPU) 512, one or more interfaces 515, and one or more busses 514 (such as a peripheral component interconnect (PCI) bus). When acting under the control of appropriate software or firmware, CPU 512 may be responsible for implementing specific functions associated with the functions of a specifically configured computing device or machine. For example, in at least one aspect, a computing device 500 may be configured or designed to function as a server system utilizing CPU 512, local memory 511 and/or remote memory 516, and interface(s) 515. In at least one aspect, CPU 512 may be caused to perform one or more of the different types of functions and/or operations under the control of software modules or components, which for example, may include an operating system and any appropriate applications software, drivers, and the like.

CPU 512 may include one or more processors 513 such as, for example, a processor from one of the Intel, ARM, Qualcomm, and AMD families of microprocessors. In some embodiments, processors 513 may include specially designed hardware such as application-specific integrated circuits (ASICs), electrically erasable programmable read-only memories (EEPROMs), field-programmable gate arrays (FPGAs), and so forth, for controlling operations of computing device 500. In a particular aspect, a local memory 511 (such as non-volatile random-access memory (RAM) and/or read-only memory (ROM), including for example one or more levels of cached memory) may also form part of CPU 512. However, there are many different ways in which memory may be coupled to system 500.

Memory 511 may be used for a variety of purposes such as, for example, caching and/or storing data, programming instructions, and the like. It should be further appreciated that CPU 512 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 515 are provided as network interface cards (NICs). Generally, NICs control the sending and receiving of data packets over a computer network; other types of interfaces 515 may for example support other peripherals used with computing device 500. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 500 for implementing one or more of the embodiments described herein, it is by no means the only device architecture on which at least a portion of the features and techniques described herein may be implemented. For example, architectures having one or any number of processors 513 may be used, and such processors 513 may be present in a single device or distributed among any number of devices. In one aspect, single processor 513 handles communications as well as routing computations, while in other embodiments a separate dedicated communications processor may be provided. In various embodiments, different types of features or functionalities may be implemented in a system according to the aspect that includes a computing device (such as a tablet device or smartphone running client software) and server systems (such as a server system described in more detail below).

Regardless of network device configuration, the system of an aspect may employ one or more memories or memory modules (such as, for example, remote storage block 516 and local storage 511) configured to store data, program instructions for the general-purpose network operations, or other information relating to the functionality of the embodiments described herein (or any combinations of the above). Program instructions may control execution of or comprise an operating system and/or one or more applications, for example. Memory 516 or memories 511, 516 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), storage memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
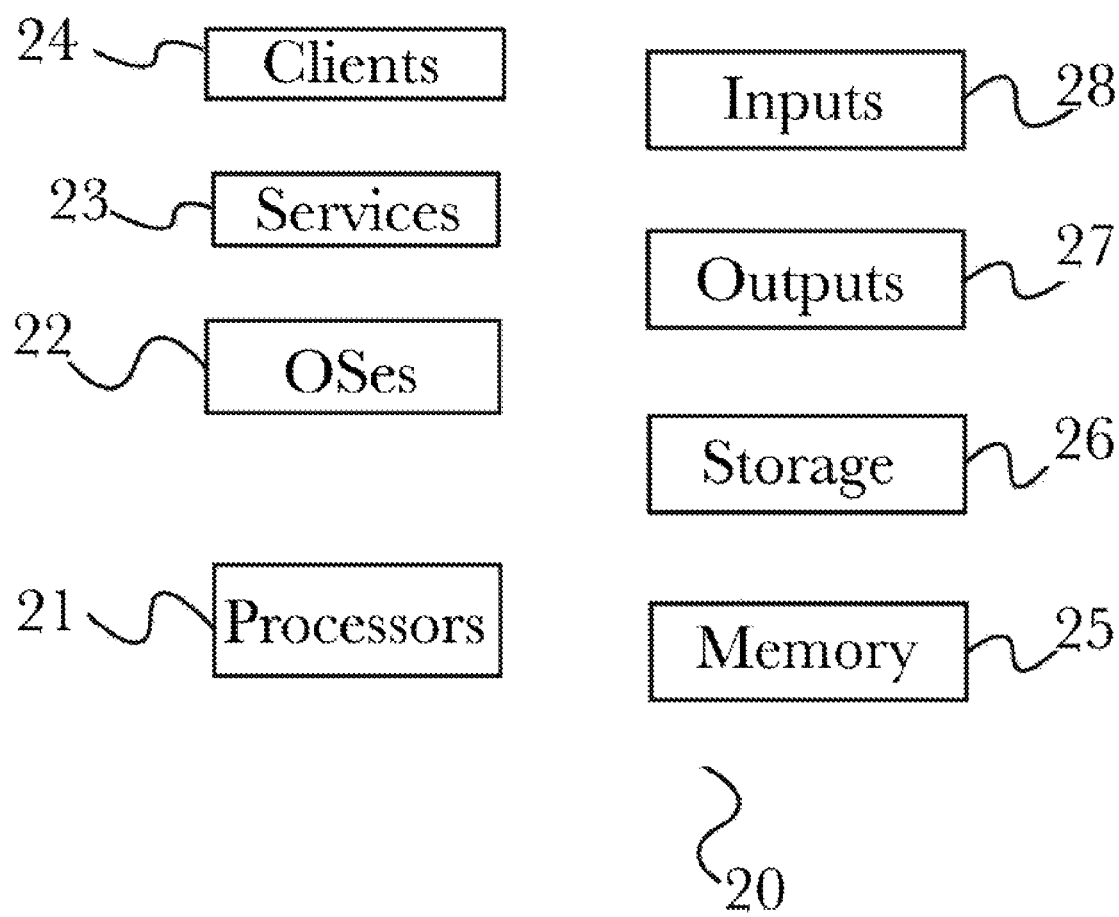
FIG. 6 is a block diagram illustrating an exemplary logical architecture for a computing device, according to a preferred embodiment of the invention.

In some embodiments, systems may be implemented on a standalone computing system. Referring now to FIG. 6, there is shown a block diagram depicting a typical exemplary architecture of one or more embodiments or components thereof on a standalone computing system. Computing device 600 includes processors 621 that may run software that carry out one or more functions or applications of embodiments, such as for example a client application 624. Processors 621 may carry out computing instructions under control of an operating system 622 such as, for example, a version of MICROSOFT WINDOWS™ operating system, APPLE macOS™ or iOS™ operating systems, some variety of the Linux operating system, ANDROID™ operating system, or the like. In many cases, one or more shared services 623 may be operable in system 600, and may be useful for providing common services to client applications 624. Services 623 may for example be WINDOWS™ services, user-space common services in a Linux environment, or any other type of common service architecture used with operating system 621. Input devices 628 may be of any type suitable for receiving user input, including for example a keyboard, touchscreen, microphone (for example, for voice input), mouse, touchpad, trackball, or any combination thereof. Output devices 627 may be of any type suitable for providing output to one or more users, whether remote or local to system 600, and may include for example one or more screens for visual output, speakers, printers, or any combination thereof. Memory 625 may be random-access memory having any structure and architecture known in the art, for use by processors 621, for example to run software. Storage devices 626 may be any magnetic, optical, mechanical, memory storage, or electrical storage device for storage of data in digital form (such as those described above). Examples of storage devices 626 include flash memory, magnetic hard drive, CD-ROM, and/or the like.

Figure 7:
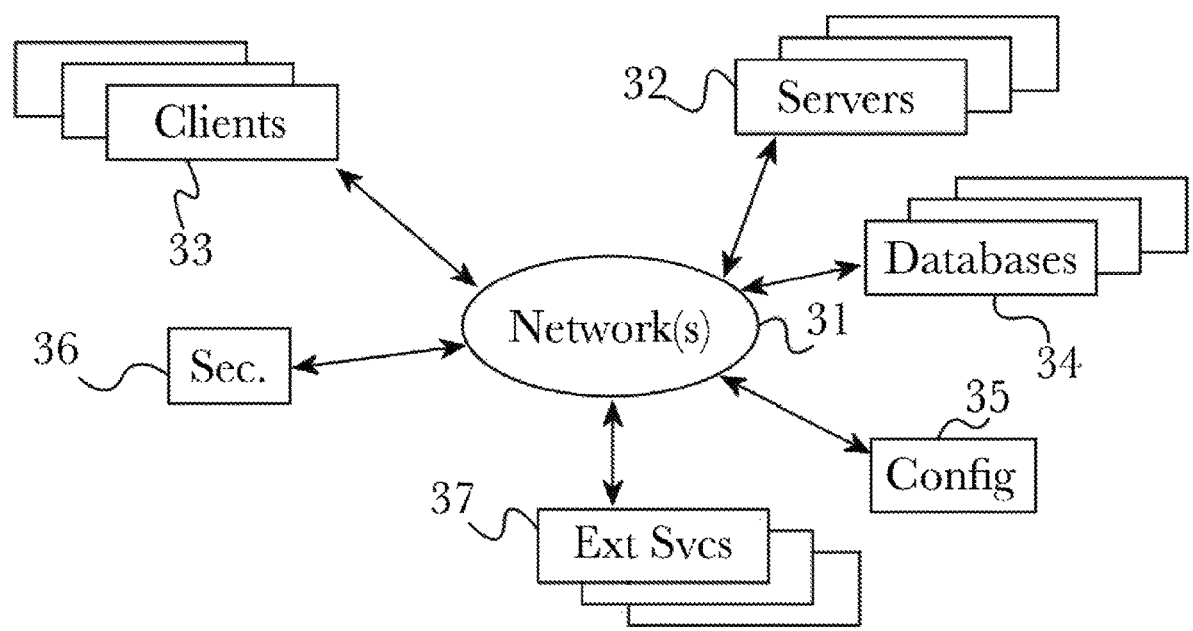
FIG. 7 is a block diagram showing an exemplary architectural arrangement of clients, servers, and external services, according to a preferred embodiment of the invention.

In some embodiments, systems may be implemented on a distributed computing network, such as one having any number of clients and/or servers. Referring now to FIG. 7, there is shown a block diagram depicting an exemplary architecture 700 for implementing at least a portion of a system according to one aspect on a distributed computing network. According to the aspect, any number of clients 733 may be provided. Each client 733 may run software for implementing client-side portions of a system; clients may comprise a system 600 such as that illustrated in FIG. 6. In addition, any number of servers 732 may be provided for handling requests received from one or more clients 733. Clients 733 and servers 732 may communicate with one another via one or more electronic networks 731, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 731 may be implemented using any known network protocols, including for example wired and/or wireless protocols.

In addition, in some embodiments, servers 732 may call external services 737 when needed to obtain additional information, or to refer to additional data concerning a particular call. Communications with external services 737 may take place, for example, via one or more networks 731. In various embodiments, external services 737 may comprise web-enabled services or functionality related to or installed on the hardware device itself. For example, in one aspect where client applications 724 are implemented on a smartphone or other electronic device, client applications 724 may obtain information stored in a server system 732 in the cloud or on an external service 737 deployed on one or more of a particular enterprise's or user's premises.

In some embodiments, clients 733 or servers 732 (or both) may make use of one or more specialized services or appliances that may be deployed locally or remotely across one or more networks 731. For example, one or more databases 734 may be used or referred to by one or more embodiments. It should be understood by one having ordinary skill in the art that databases 734 may be arranged in a wide variety of architectures and using a wide variety of data access and manipulation means. For example, in various embodiments one or more databases 734 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 736 and configuration systems 735. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 736 or configuration system 35 or approach is specifically required by the description of any specific aspect.

Figure 8:
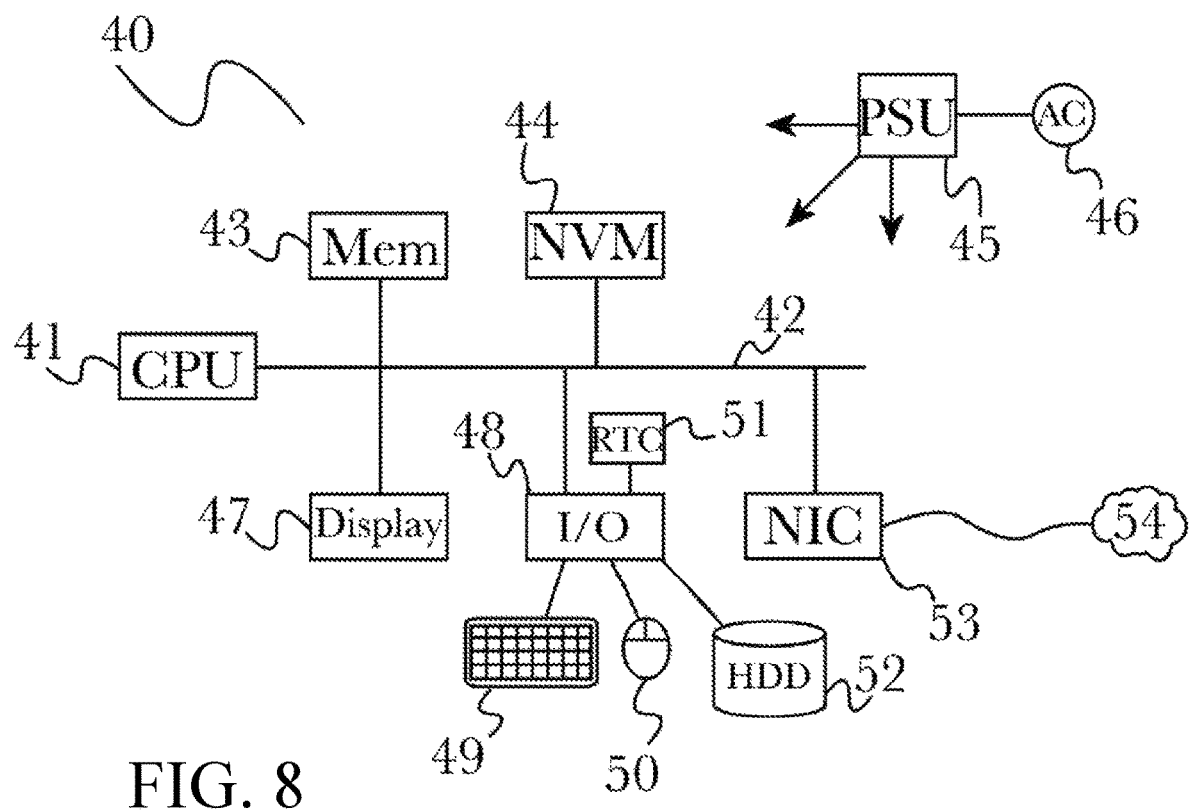
FIG. 8 is another block diagram illustrating an exemplary hardware architecture of a computing device, according to a preferred embodiment of the invention.

FIG. 8 shows an exemplary overview of a computer system 800 as may be used in any of the various locations throughout the system. It is exemplary of any computer that may execute code to process data. Various modifications and changes may be made to computer system 800 without departing from the broader scope of the system and method disclosed herein. Central processor unit (CPU) 841 is connected to bus 842, to which bus is also connected memory 843, nonvolatile memory 844, display 847, input/output (I/O) unit 848, and network interface card (NIC) 853. I/O unit 848 may, typically, be connected to keyboard 849, pointing device 850, hard disk 852, and real-time clock 851. NIC 853 connects to network 854, which may be the Internet or a local network, which local network may or may not have connections to the Internet. Also shown as part of system 800 is power supply unit 845 connected, in this example, to a main alternating current (AC) supply 846. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product comprising a non-transitory computer readable storage medium having instruction encoded thereon that, when executed by a processor, cause the processor to:
   receive a digital image representing a view within a field of view of a camera element, wherein the digital image is comprised of one or more subjects;
   obtain illuminance values associated with one or more areas near the camera element;
   select the illuminance values that are likely associated with the one or more subjects; calculate a target illuminance values to light-up the one or more subjects, wherein the target illuminance value is computed from the selected illuminance value;
   obtain an approximate distance value representing a distance between one or more light sources and the one or more subjects;
   compute a target brightness value for the one or more light sources, wherein the target brightness value computation is based on the target illuminance value and the obtained approximate distance value;
   compute actual brightness values for the one or more light sources based on physical limitation factors;
   compute actual illuminance values based on actual brightness values for the one or more light sources, the obtained approximate distance values, and the selected illuminance values;
   identify appropriate camera settings for exposing the one or more subjects based on actual illuminance values, the camera settings comprising one or more of: shutter speed, aperture, and image sensor sensitivity;
   identify appropriate brightness settings based on actual brightness values;
   provide identified camera settings values to a controller associated with camera element; and
   provide identified brightness settings to a controller associated with the light source.

2. The computer program product of claim 1, further comprising a non-transitory computer readable storage medium having instruction encoded there on that, when executed by a processor, cause the processor to:
   receive color values for one or more areas around the camera element;
   compute white balance settings for obtaining an appropriate color the one or more subjects, wherein the white balance settings are computed based on the received color temperature values, wherein the white balance setting is a camera setting;
   compute color settings for the one or more light sources based on the received color temperature values and/or the computed white balance values;
   provide computed white balance settings to the controller associated with the camera element; and
   provide computed color values to the controller associated with the one or more light sources.

3. The computer program product of claim 2, wherein the color temperature values are obtained from a color sensor and/or a computing device.

4. The computer program product of claim 3, wherein, if the one or more light sources is emitting a light, then the obtained color temperature values are adjusted to account for the contributions made by the light sources, wherein the contributions made by the light sources are obtained from the controller associated with the light source.

5. A The computer program product of claim 2, wherein the obtained color temperature values are further comprised of color temperature values and/or color tint values.

6. The computer program product of claim 2, further comprising adjusting the color temperature values based on a difference between the color limitation factors and the received color temperature values for one or more areas around the camera element.

7. The computer program product of claim 1, wherein digital images are continuously received from a camera element.

8. The computer program product of claim 1, wherein the approximate distance between the light source and the one or more items within the field of view of the camera element is obtained from a distance sensor unit and/or a computing device.

9. The computer program product of claim 8, wherein the distance sensor unit computes the approximate distance value by identifying the distance between the one or more light sources and the one or more subjects that are within the field of view of the camera element that is closest to the one or more light sources.

10. The computer program product of claim 8, wherein the distance sensor unit is comprised of one or more of the following: an infrared emitter, an infrared camera, and a proximity sensor.

11. The computer program product of claim 8, wherein the computing device may compute an approximate distance between the camera element and the one or more items within the field of view of the camera element by applying computer vision analysis.

12. The computer program product of claim 11, wherein computer vision analysis is comprised of identifying one or more likely subjects within the digital image, wherein the one or more likely subjects are identified by identifying, within the digital image, one or more of the following: faces, eyes, human bodies, and/or subject attributes.

13. The computer program product of claim 12, wherein the computer vision analysis is further comprised of applying subject selection analysis to identify the one or more subjects within the identified one or more likely subjects when more than one likely subject is identified.

14. The computer program product of claim 13, wherein the subject selection analysis is comprised of identifying one or more likely subjects having a largest relative size based on identified attributes.

15. The computer program product of claim 8, wherein the sense-vision selection factors are applied to select the approximate distance values from one of the distance sensor or the computing device, wherein the sense-vision selection factors are applied when approximate distance values are received from both the distance sensor and the computing device.

16. The computer program product of claim 1, wherein illuminance values are obtained from one or more illuminance sensors and/or a computing device.

17. The computer program product of claim 1, wherein illuminance values are obtained by applying an estimation analysis to illuminance sensor values obtained from one or more illuminance sensors, wherein the illuminance sensor values represent illuminance measured by each illuminance sensor, and wherein the estimation analysis is comprised of selecting a highest illuminance sensor value obtained from the one or more illuminance sensors.

18. A system for automatically setting one or more image parameters for improved photography and image, the system comprising:
  a camera element in a mobile computing device, the camera element capturing a digital representation of items within a field of view of the camera element;
  an illuminance sensor coupled to the camera element for measuring the amount of illuminance in an area surrounding the mobile computing device;
  a color sensor coupled to the illuminance sensor for measuring a color temperature in an area surrounding the mobile computing device;
  a processor coupled within the mobile computing device, the processor configured to identify faces and/or objects within a digital image that is captured by the camera element, the processor further configured to identify one or more likely subjects within the digital image that is captured by the camera element, the processor further configured to identify an approximate distance between the likely subjects and the camera element, the processor further configured to calculate a target illuminance to illuminate the likely subjects at a desired uniformity, the processor further configured to calculate an actual illuminance based on limitations of a lighting system that is associated with the mobile computing device, the processor further configured to calculate camera settings and lighting settings to obtain the target illuminance; and
  an external light source that is coupled to the mobile computing device, the external light source configured to emit a light intensity to uniformly illuminate the likely subjects based on calculations made by the processor, the external lighting unit further configured to emit a Kelvin of color that matches the color temperature measured by the color sensor.

19. The system of claim 18, wherein the camera settings include a shutter speed required to calculate the target illuminance.

20. The system of claim 18, wherein the processor is configured to determine where a group of people are located within the digital image.

* * * * *